(12) United States Patent
Roberts et al.

(10) Patent No.: US 7,145,714 B2
(45) Date of Patent: Dec. 5, 2006

(54) SEGMENTED ELECTRODES FOR POLING OF FERROELECTRIC CRYSTAL MATERIALS

(75) Inventors: Anthony D. Roberts, Bozeman, MT (US); Philip R. Battle, Bozeman, MT (US)

(73) Assignee: AdvR, Inc., Bozeman, MT (US)

( * ) Notice: Subject to any disclaimer, the term of this patent is extended or adjusted under 35 U.S.C. 154(b) by 18 days.

(21) Appl. No.: 10/898,788

(22) Filed: Jul. 26, 2004

(65) Prior Publication Data

US 2006/0018599 A1   Jan. 26, 2006

(51) Int. Cl.
*G02F 1/35* (2006.01)
*C30B 33/04* (2006.01)

(52) U.S. Cl. .......................................... 359/326; 117/2
(58) Field of Classification Search ........ 359/326–332; 117/2; 385/122
See application file for complete search history.

(56) References Cited

U.S. PATENT DOCUMENTS

| | | | |
|---|---|---|---|
| 5,170,460 A | 12/1992 | Arvidsson et al. | 385/129 |
| 5,193,023 A | 3/1993 | Yamada et al. | 359/245 |
| 5,436,758 A | 7/1995 | Agostinelli et al. | 359/332 |
| 5,477,807 A | 12/1995 | Yamada et al. | 117/2 |
| 5,521,750 A | 5/1996 | Onoe et al. | 359/332 |
| 5,526,173 A | 6/1996 | Yamaguchi et al. | 359/328 |
| 5,568,308 A | 10/1996 | Harada | 359/326 |
| 5,615,041 A | 3/1997 | Field et al. | 359/326 |
| 5,652,674 A | 7/1997 | Mizuuchi et al. | 359/326 |
| 5,734,772 A | 3/1998 | Gopalan et al. | 385/122 |
| 5,748,361 A | 5/1998 | Gupta et al. | 359/332 |
| 5,756,263 A | 5/1998 | Gupta et al. | 430/317 |
| 5,766,340 A * | 6/1998 | Geosling | 117/2 |
| 5,875,053 A | 2/1999 | Wenjorn et al. | 359/326 |
| 5,986,798 A | 11/1999 | Karlsson et al. | 359/326 |
| 6,195,197 B1 | 2/2001 | Gopalan et al. | 359/326 |
| 6,211,999 B1 | 4/2001 | Gopalan et al. | 359/326 |
| 6,295,159 B1 | 9/2001 | Lung-Han et al. | 359/326 |

(Continued)

FOREIGN PATENT DOCUMENTS

KR   10-2003-0048386   6/2003

(Continued)

OTHER PUBLICATIONS

Korea Institute of Patent Information, Detailed Information for Publication No. 10-2003-0048386, Jun. 19, 2003.

(Continued)

*Primary Examiner*—John D. Lee
(74) *Attorney, Agent, or Firm*—Altera Law Group, LLC

(57) ABSTRACT

The manufacture of optical devices by reversing domains in specific patterns in ferroelectric crystal material is practiced using a segmented electrode rather than a continuous electrode on at least one of the surfaces of the ferroelectric crystal material. Independent poling voltages are selectively applied to the segments to create various electric fields inside the ferroelectric crystal material. In this manner, portions of the desired domain-reversed pattern are individually established in the ferroelectric crystal material in high fidelity with their respective electrode segments so that upon completion of poling, the entire domain-reversed structure is established in the ferroelectric crystal material in high fidelity relative to the entire electrode. Parameters of the electrode segment that may be varied singly or in combination to achieve a desired degree of fidelity include the overall size of the electrode segment, as well as the shape and size of the features included in the electrode segment.

25 Claims, 7 Drawing Sheets

U.S. PATENT DOCUMENTS

| | | |
|---|---|---|
| 6,480,325 B1 | 11/2002 | Batchko et al. ............. 359/330 |
| 6,542,285 B1 | 4/2003 | Batchko et al. ............. 359/326 |
| 6,555,293 B1 | 4/2003 | Fejer et al. ................. 430/311 |
| 6,597,492 B1 | 7/2003 | Rosenman et al. ......... 359/326 |
| 6,624,923 B1 | 9/2003 | Furukawa et al. .......... 359/326 |
| 6,631,024 B1 | 10/2003 | Paquet et al. ............... 359/326 |
| 6,673,330 B1 | 1/2004 | Kitamura et al. ........ 423/594.8 |
| 6,710,912 B1 | 3/2004 | Filkins et al. ............... 359/326 |
| 6,731,422 B1* | 5/2004 | Yamaguchi et al. ........ 359/332 |
| 2003/0231375 A1 | 12/2003 | Ju et al. ...................... 359/332 |
| 2005/0084199 A1* | 4/2005 | Hirohashi et al. ............ 385/14 |
| 2005/0133477 A1* | 6/2005 | Esseian ....................... 216/24 |

FOREIGN PATENT DOCUMENTS

| | | |
|---|---|---|
| KR | 10-2003-0048387 | 6/2003 |
| KR | 10-2003-0095816 | 12/2003 |

OTHER PUBLICATIONS

Korea Institute of Patent Information, Detailed Information for Publication No. 10-2003-0048387, Jun. 19, 2003.

Korea Institute of Patent Information, Detailed Information for Publication No. 10-2003-0095816, Dec. 24, 2003.

Ridderbusch, Heiko, et al., Electro-optic modification of second-harmonic phase-matching spectra in segmented periodically poled $LiNBO_3$, *Journal of the Optical Society of America B*, vol. 19, No. 2, Feb. 2002, pp. 280-288.

* cited by examiner

SEGMENTED ELECTRODES FOR POLING OF FERROELECTRIC CRYSTAL MATERIALS

BACKGROUND OF THE INVENTION

1. Field of the Invention

The present invention is directed to optical devices, and more particularly to poling of ferroelectric crystal materials to create optical devices.

2. Description of the Related Art

The process of reversing domains in specific patterns in a ferroelectric crystal is used to create many useful optical devices. Domain reversal, or poling, is typically accomplished by placing electrodes on the top and bottom surface of the ferroelectric crystal, then applying a voltage profile to the electrodes. One surface typically supports a single large continuous electrode, while the other surface may support a correspondingly continuous electrode or a ground plane. The applied voltage creates an electric field inside the ferroelectric crystal, and the domains become aligned with the electric field in the regions corresponding more or less to the shape of the electrode. After the applied voltage is discontinued, the domains retain their alignment permanently or until the crystal is re-poled. The electrodes are typically removed upon termination of the poling process.

Unfortunately, the pattern resulting in the poled area does not always correspond sufficiently well or predictably to the electrode shape. Small scale pattern fidelity can be compromised, for example, due to variations in the ferroelectric crystal or crystal-to-electrode contact when domain reversed regions are created over large areas of the surface of the ferroelectric crystal. Pattern fidelity can also be compromised when the electrode pattern contains features of different size and/or shape, inasmuch as the electrical poling voltage profile and current applied to the electrode may not be optimal for all of the features.

Therefore, a need exists for improving the fidelity of domain reversed patterns in ferroelectric crystals.

BRIEF SUMMARY OF THE INVENTION

Advantageously, at least some embodiments of the present invention achieve domain-reversed patterns in ferroelectric crystal material over extensive distances while maintaining good fidelity on a small scale.

Advantageously, at least some embodiments of the present invention achieve improved fidelity of domain-reversed patterns in ferroelectric crystal material for features of varying size and/or shape.

One embodiment of the present invention is a method for poling ferroelectric crystal material to form one or more optical devices, comprising: defining a first optically effective region in a first predetermined portion of the ferroelectric crystal material; poling the first predetermined portion with a first poling voltage profile to establish a first domain aligned in a predetermined direction, the first domain having an edge that defines at least part of the first optically effective region, and the first poling voltage profile being optimized for the first predetermined portion; defining a second optically effective region in a second predetermined portion of the ferroelectric crystal material; and poling the second predetermined portion with a second poling voltage profile to establish a second domain aligned in a predetermined direction, the second domain having an edge that defines at least part of the second optically effective region, and the second poling voltage profile being optimized for the second predetermined portion.

A further embodiment is a substrate for use in fabricating optical elements for optical devices, comprising: a volume of ferroelectric crystal material; means for defining a first optically effective region in a first predetermined portion of the ferroelectric crystal material; means for poling the first predetermined portion with a first poling voltage profile to establish a first domain aligned in a predetermined direction, the first domain having an edge that defines at least part of the first optically effective region, and the first poling voltage profile being optimized for the first predetermined portion; means for defining a second optically effective region in a second predetermined portion of the ferroelectric crystal material; and means for poling the second predetermined portion with a second poling voltage profile to establish a second domain aligned in a predetermined direction, the second domain having an edge that defines at least part of the second optically effective region, and the second poling voltage profile being optimized for the second predetermined portion.

A further embodiment is a substrate for use in fabricating optical elements for optical devices, comprising: a volume of ferroelectric crystal material; a first electrode segment disposed on a first surface of the ferroelectric crystal material and consisting of a plurality of first interconnected features of a substantially uniform electrical shape and size for establishing a first domain extending into the ferroelectric crystal material from the first electrode segment, upon application of a first poling voltage profile; and a second electrode segment disposed on the first surface of the ferroelectric crystal material and consisting of a plurality of second interconnected features of a substantially uniform electrical shape and size for establishing a second domain extending into the ferroelectric crystal material from the second electrode segment, upon application of a second poling voltage profile; wherein the electrical shape and size of the first interconnected features differs from the electrical shape and size of the second interconnected features.

A further embodiment is a substrate for use in fabricating optical elements for optical devices, comprising: a volume of ferroelectric crystal material; a first electrode segment disposed on a first surface of the ferroelectric crystal material and being sized to allow compensation for adverse poling effects of electrical and physical non-uniformity in the ferroelectric crystal material; and a second electrode segment disposed on the first surface of the ferroelectric crystal material and being sized to allow compensation for adverse poling effects of electrical and physical non-uniformity in the ferroelectric crystal material.

DETAILED DESCRIPTION OF THE INVENTION, INCLUDING THE BEST MODE

Figure 1:
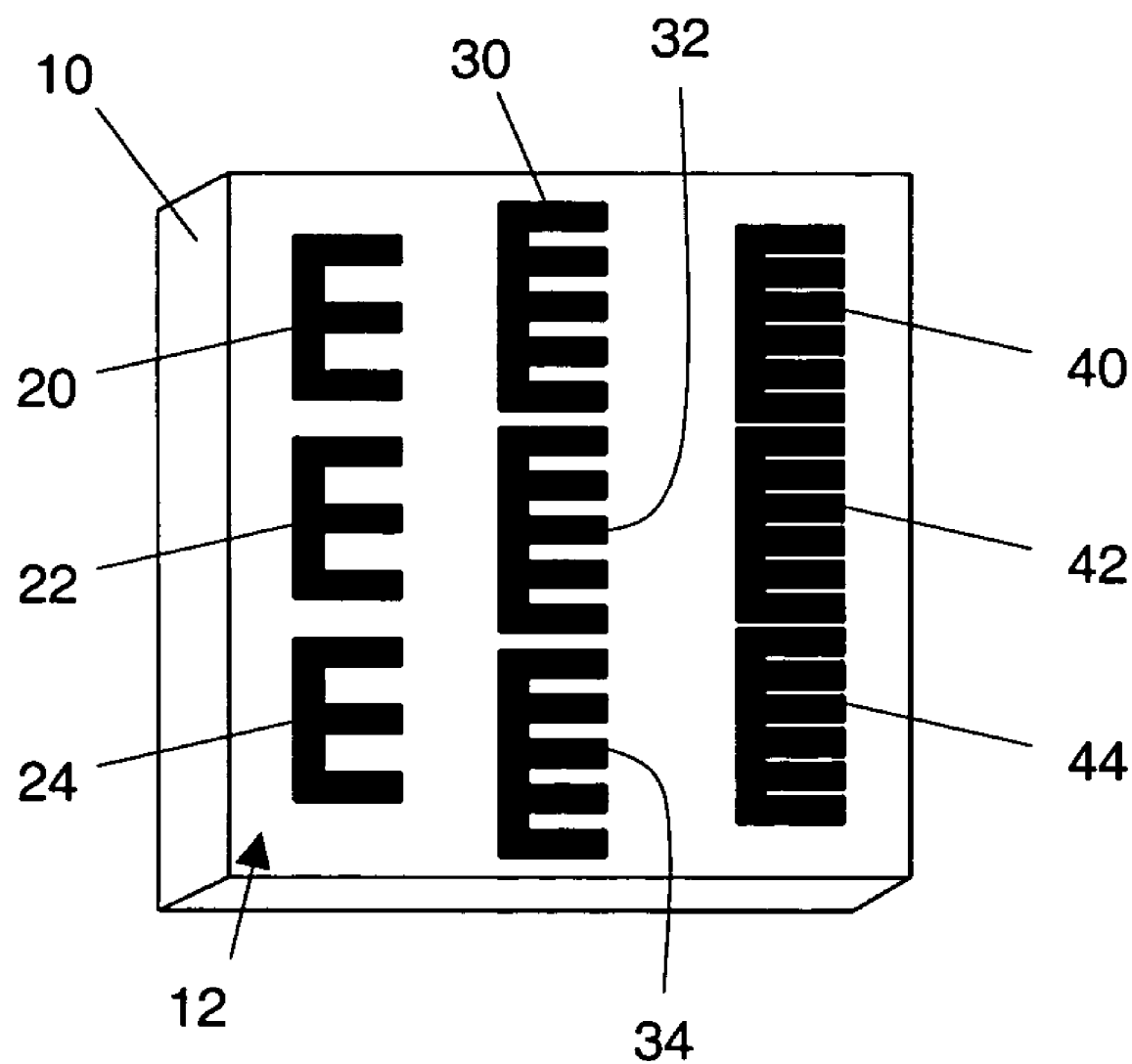
FIG. 1 is a perspective schematic view of a periodically poled ferroelectric crystal substrate with a segmented electrode.

The manufacture of optical devices by deliberately aligning domains in specific patterns in ferroelectric crystal material is practiced using a segmented electrode rather than a continuous electrode on at least one of the surfaces of the ferroelectric crystal. A region that is optically effective in some manner, such as a refracting, diffracting or reflecting interface, or an interface at which the nonlinear coefficient changes sign, is created at the interface between domains of one alignment and domains of a different alignment. Independent poling voltage profiles are selectively applied to the segments using any suitable type of poling voltage system, including multiple poling voltage circuits as well as an adjustable poling voltage circuit having multiple addressable outputs. The poling voltages are used to create various electric fields inside the ferroelectric crystal so that portions of the desired domain-reversed pattern are individually established in the ferroelectric crystal in high fidelity with their respective electrode segments. As a result, the domain-reversed patterns are established in the ferroelectric crystal in high fidelity relative to the entire electrode. A suitable poling monitoring process is used to detect the completion of the poling operation.

Parameters of the electrode segment that may be varied to achieve a desired degree of fidelity include the overall size of the electrode segment, as well as the shape and size of the features included in the electrode segment. These parameters may be used singly or in combination to achieve the desired degree of fidelity.

As to the overall size of an electrode segment, the overall size is selected to reduce the adverse effects on fidelity of such electrical and physical non-uniformity as may exist in the ferroelectric crystal material and other materials used during the poling process. The electrode segment preferably should cover an area on the ferroelectric crystal material surface that is small enough so that the poling monitoring process is sensitive to and can compensate for the variations, without being so small as to unnecessarily inflate the number of segments. Having an unnecessarily large number of electrode segments increases the complexity of the poling voltage system and the total time needed for poling the substrate.

As to the shape and size of the features in an electrode segment, these are selected to reduce the adverse effects on fidelity of shape-related and size-related electric field behavior. The electrode segment preferably should contain features having similar shape and size related electric field behavior. In this situation, the time-varying voltage applied to a particular segment may be specifically tailored for that segment. As the particular task of determining the characteristics of the poling voltage is well known to one skilled in the art, it will not be further described herein.

If an electrode segment has a uniform pattern or has features of a uniform electrical shape and size, and also is small enough so that the ferroelectric crystal material and the electrode contact are essentially homogeneous as pertains to poling, then the poling is most likely to be of uniformly high fidelity throughout the area covered by the electrode segment. The domain-reversed patterns are realized from the various parts of the patterns individually created from the electrode segments.

FIG. 1 is a perspective schematic diagram of a periodically poled ferroelectric crystal substrate 10 having a segmented electrode on a major surface 12. The other major surface (not shown) of the ferroelectric crystal substrate 10 has an electrode of any suitable layout, typically a uniform electrode such as a conductive ground plane or reference plane, although the other major surface may also have any suitable segmented or non-segmented electrode as desired. After the poling process, the ferroelectric crystal substrate 10 contains a grating structure formed by a domain-reversed pattern that is very similar to the segmented electrode 12. To achieve high fidelity of the domain-reversed pattern throughout the entire extent of the grating, the electrode is fabricated in segments 20, 22, 24, 30, 32, 34, 40, 42 and 44, the characteristics of which are determined both by non-uniformity in the ferroelectric crystal substrate 10 as well as by the shape and size of the grating features. The segments 20, 22, 24, 30, 32, 34, 40, 42 and 44 may be individually addressable by an poling voltage system (not shown), and the poling voltage profile is established individually for each segment. The poling may be performed sequentially or simultaneously or sequentially in groups, depending on the type of poling voltage system used and the potential for interference between poling of the various electrode segments.

Generally, a ferroelectric crystal substrate may be used for one optical device or several optical devices. The ferroelectric crystal substrate 10 shown in FIG. 1 contains several periodically poled gratings of different periods or spacings between the grating cycles. The electrode segments 20, 22 and 24, for example, are used to form one grating of a particular period, the electrode segments 30, 32 and 34 are used to form another grating of a different period, and the electrode segments 40, 42 and 44 are used to form a third grating of yet a different period. One potential use of gratings of different periods in the same optical device is to allow efficient quasi-phase-matched (QPM) nonlinear frequency conversion at different frequencies. Alternatively, the ferroelectric crystal substrate 10 may be diced into several pieces to produce individual devices from the same substrate.

The segmentation of the poling electrode as shown in FIG. 1 allows for optimized poling of the different periods, as well as reduction of fidelity degradation due to materials non-uniformity. Illustratively, the poling voltage profile applied to the segments 20, 22 and 24 may be optimized for the period thereof, the poling voltage profile applied to the segments 30, 32 and 34 may be optimized for the period thereof, and the poling voltage profile applied to the segments 40, 42 and 44 may be optimized for the period thereof.

The fidelity achievable with the segmented electrode shown in FIG. 1 is improved over a non-segmented approach, in which all regions and all periods are poled together. A non-segmented electrode achieves a generally compromised performance, averaged over the substrate (better in some parts, and worse in others) and averaged over feature size and shape.

The poling of ferroelectric crystal material for a particular segment may be optimized with a time-varying poling voltage. Because the electrode segment may correspond to an area with an unknown variation, the appropriate voltage signal may not be known prior to poling, in which case it is appropriate to monitor the poling as it is taking place so that the voltage signal can be modified during the course of domain reversal to achieve the proper degree of poling. Monitoring the poling is generally accomplished by measuring the poling current to keep track of the total poling charge delivered to the sample, or by viewing the poled area of the crystal, or by both of these simultaneously. The time-varying poling voltage may have a constant voltage applied for a particular length of time, or may be more complex, using multiple voltages for different durations, or continuously-varying voltages, perhaps in combination with constant voltages. The terms voltage profile and time-varying voltage, as used herein, are intended to signify use of any of these voltage configurations, including voltages that change over the course of their duration, constant voltages applied for a particular durations, and combinations of varying and constant voltages.

Electrode segments may be fabricated in any of a variety of different ways. One method is to create a conductive electrode pattern directly on the surface of the ferroelectric crystal material. A thin layer of metal or other conducting material is deposited directly on the surface of the ferroelectric crystal material and patterned using well-known microfabrication techniques to form the individual electrode segments. After each segment is individually poled, the conductive electrode layer may be removed from the crystal using other well-known microfabrication techniques.

Another method of implementation that is particularly useful is to first create the conductive pattern on a separate substrate and then place the electrode substrate in contact with the surface of the ferroelectric crystal material for poling. In this method the electrode pattern is first fabricated on a separate substrate using well-known methods of microfabrication. This substrate, which contains the array of electrode segments, is then pressed onto the surface of the ferroelectric. Each electrode segment is provided with a poling voltage profile, after which the substrate may be removed from the ferroelectric crystal. This method is particularly versatile since the microfabrication steps can be performed on a more suitable material, whereas the size of the crystal and other processing constraints such as sensitivity to temperature or chemicals may limit the use of microfabrication on the ferroelectric crystal material itself.

A variation of the foregoing is to fabricate on the ferroelectric crystal material the features from which the domain-reversed patterns are directly formed, and to fabricate on a separate substrate the conductive patterns for interconnecting the features of each segment of the segmented electrode. The segment electrode is completed when the separate substrate is pressed against the ferroelectric crystal.

Segmented electrodes may be used for poling any type of ferroelectric crystal material, particularly those that have a low coercive field in which the process of poling the material can be carried out using a lower voltage. For low coercive field ferroelectrics, the electrode segments may be arranged so that they are very close to each other, in order to minimize the size of the gap that keeps them electrically insulated from each other. The insulating space between electrode segments should preferably be large enough to minimize the risk of electrical arcing and stray fields from a segment that is being poled to a neighboring segment that is not being poled. Because arcing is less likely to occur in low coercive field ferroelectrics, the insulating gaps may be reduced in size, and as a result, individual features on the electrodes may be more closely spaced than if a single electrode were used. Note that one or more of the segments may pole the ferroelectric crystal material simultaneously, with similar or dissimilar voltage profiles. For instance, if a particular electrode segment is driven at a high voltage for poling, then an adjacent segment may be driven at a lower voltage simultaneously, so that the lower voltage may reduce the risk of arcing while keeping the material below its coercivity.

Suitable ferroelectric crystals with low coercive fields that can benefit from segmented electrode poling include, but are not limited to, flux grown potassium titanyl phosphate (KTP), low or high temperature hydrothermal KTP, potassium titanyl arsenate (KTA), rubidium titanyl phosphate (RTP), rubidium titanyl arsenate (RTA), stoichiometric lithium tantalate ($LiTaO_3$), stoichiometric lithium niobate ($LiNbO_3$), potassium niobate ($KNbO_3$), and magnesium-oxide-doped lithium tantalate or lithium niobate in congruent or stoichiometric form. Other materials that may benefit from segmented electrode poling, which do not necessarily have a low coercive field, are lithium niobate or lithium tantalate in congruent form. Note that segmented poling may also be used in a layered structure, where the ferroelectric crystal material is present in one or more layers. Note that one or more types of ferroelectric crystal material may be present in such a layered structure, as well.

In addition to creating optical devices for nonlinear frequency conversion, domain patterning may be used to create electrooptic devices, which include refractive elements, such as lenses and prisms, as well as diffractive elements, such as diffraction gratings or Bragg structures. In each of the resulting electrooptic structures, an external electric field is applied (usually oriented perpendicular to the propagation direction of light inside the crystal), which in some manner modifies the propagating light. The light inside the electrooptic device may travel by free space propagation or by confinement in a channel or waveguide.

Figure 2:
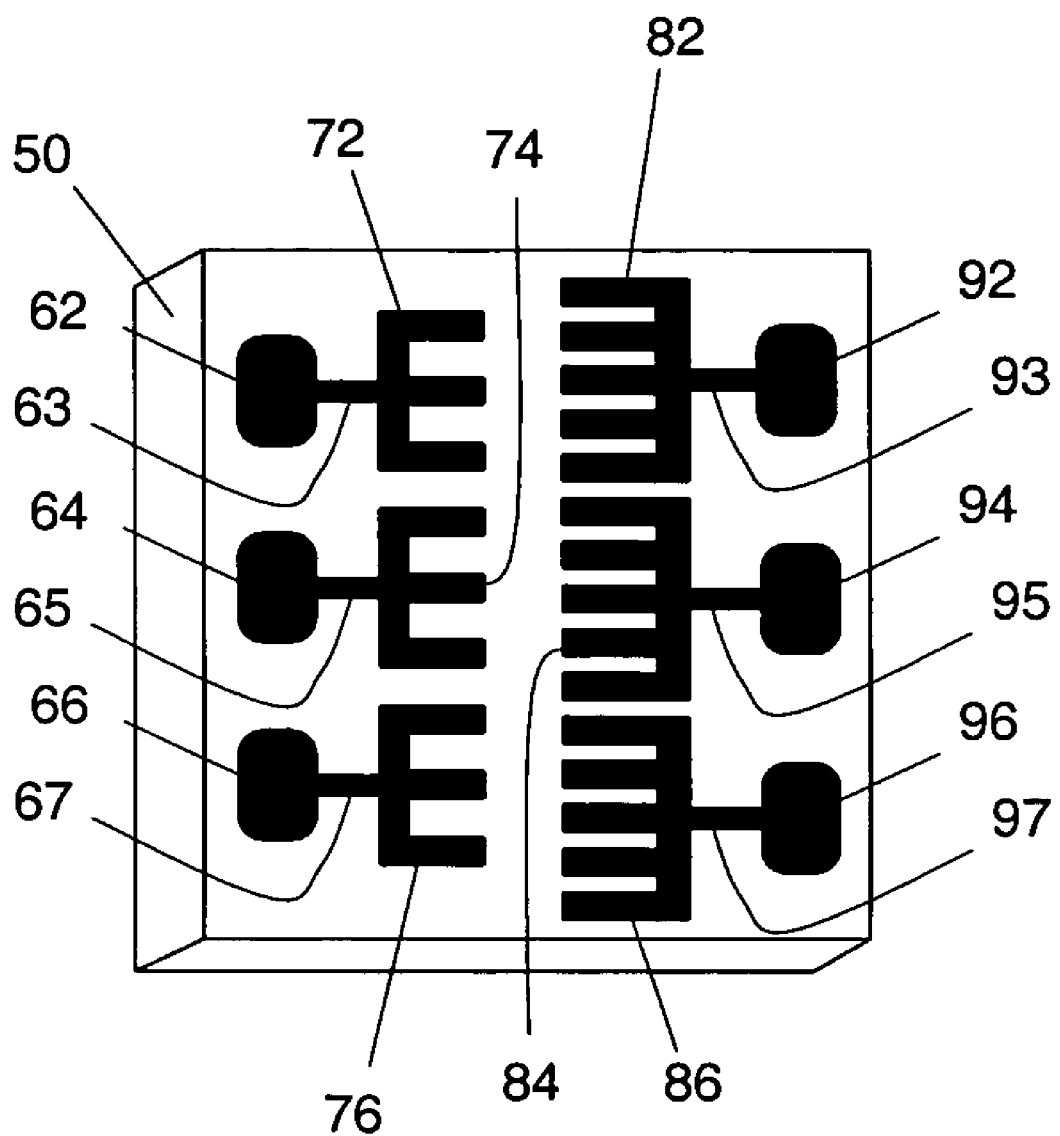
FIG. 2 is a perspective schematic view of a periodically poled ferroelectric crystal substrate with a segmented electrode having electrical contact points.

FIG. 2 shows a ferroelectric crystal substrate 50 with electrode segments 74, 74 and 76 of one period, and electrode segments 82, 84 and 86 of another period. Each of the electrode segments includes an associated electrical pathway that extends to an electrical contact point, illustratively a bonding pad, outside of the segment for electrically connecting the electrode segment to the external electrical poling circuit (not shown). As shown in FIG. 2, for example, segment 72 has a pathway 63 that extends to pad 62, segment 74 has a pathway 65 that extends to pad 64, segment 76 has a pathway 67 that extends to pad 66, segment 82 has a pathway 93 that extends to pad 92, segment 84 has a pathway 95 that extends to pad 94, and segment 86 has a pathway 97 that extends to pad 96. The optional large electrode "pads" outside of the poling pattern are used to attach wires via wire bonding, soldering, or any other well-known method of electrical connection.

Figure 3:
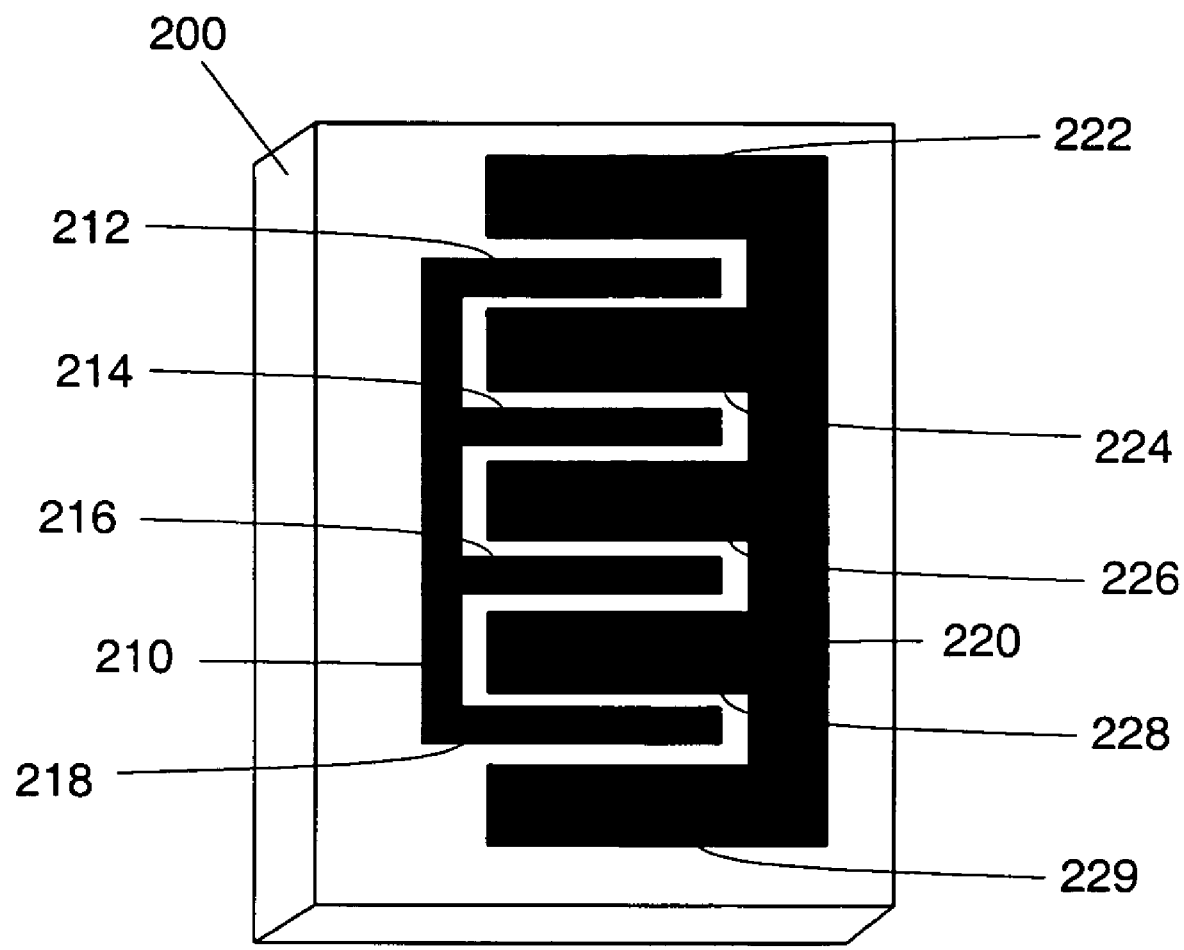
FIG. 3 is a perspective schematic view of a periodically poled ferroelectric crystal substrate with a segmented electrode having features of different sizes.

The design of the electrode segments may also be chosen so that features of different sizes can be poled within the same area of the pattern. For instance, FIG. 3 shows a ferroelectric crystal substrate 200 having an electrode useful for creating domain-reversed patterns in which wide lines alternate with narrow lines separated by a narrow upoled line. Segmenting the electrode into one segment 220 with features 222, 224, 226, 228 and 229 that address the wide lines, and another segment 210 with features 212, 214, 216 and 218 that address the narrow lines enables higher poling fidelity to be achieved, in that the time-varying voltage used during poling may be separately optimized for the two electrode segments 210 and 220. Likewise, similar shapes in the electrode patterns may be grouped together on the same electrode segment, in the same manner that similar sizes are grouped in FIG. 3, with different shapes and sizes in different segments.

For some devices, such as a grating, it may be desirable to have abutting regions of alternating-orientation domains. In other words, an "up" domain is located next to a "down" domain, then another "up" domain, and so on. In terms of the electrode pattern of FIG. 3, it may be desirable that the lines of one electrode segment 210 be located as close as possible to the lines of the other electrode segment 220, with the minimum spacing that is required for electrical insulation between the two segments 210 and 220.

Figure 4:
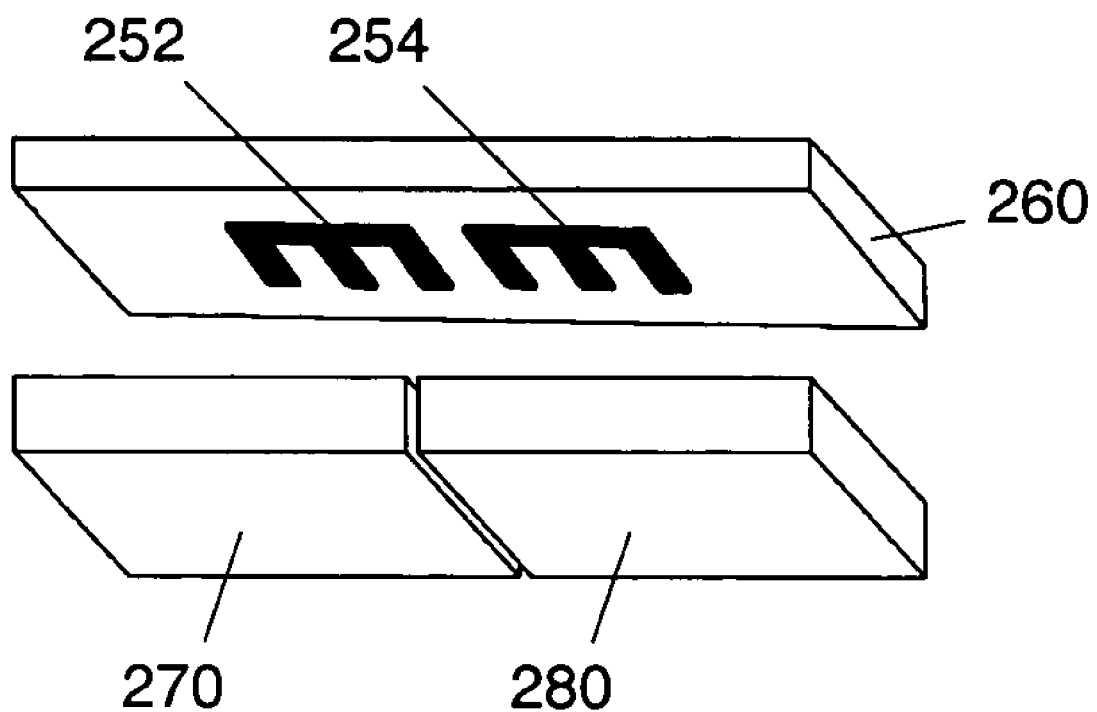
FIG. 4 is a perspective schematic view of a segmented electrode suitable for creating poling patterns in more than one ferroelectric crystal substrate.

Segmented electrodes may also be used to create poling patterns that span more than one ferroelectric substrate, as shown in FIG. 4. An electrode substrate 260 has an electrode with segments 252 and 254 fabricated thereon. The electrode substrate 260 is placed in contact with ferroelectric crystal substrates 270 and 280. Time-varying poling voltages are applied to the segments 252 and 254, wherein the profiles of the voltages preferably are optimized for the segments 252 and 254 to cause the appropriate high-fidelity domain reversals in the respective ferroelectric crystal substrates 270 and 280. Upon completion of poling, the electrode substrate 260 is removed from the ferroelectric crystal substrates 270 and 280. Advantageously, use of a separate electrode substrate enables the creation of poled structures that are larger than the available ferroelectric crystal substrate size, and enables the use of different crystal materials or different orientations in the same poled structure.

Once poled, the poled patterns in the ferroelectric crystal substrates 270 and 280 have a relative alignment that is determined by their fidelity to the electrode segments 252 and 254, which is more precise than that which can generally be achieved by aligning two previously poled ferroelectric crystal substrates.

While FIG. 4 shows the use of a separate electrode substrate with two ferroelectric crystal substrates, an electrode substrate may be used with more than two ferroelectric optical substrates, or with just one ferroelectric optical substrate.

Although omitted from FIG. 1 through FIG. 4 for clarity, a second electrode would generally be used on the side of the ferroelectric crystal substrate opposite the electrode illustrated. This second electrode may or may not be segmented, depending on the complexity of the desired poling structure. Alternatively, the second electrode may be a featureless plate that effectively covers the entire surface area of the ferroelectric crystal.

Figure 5:
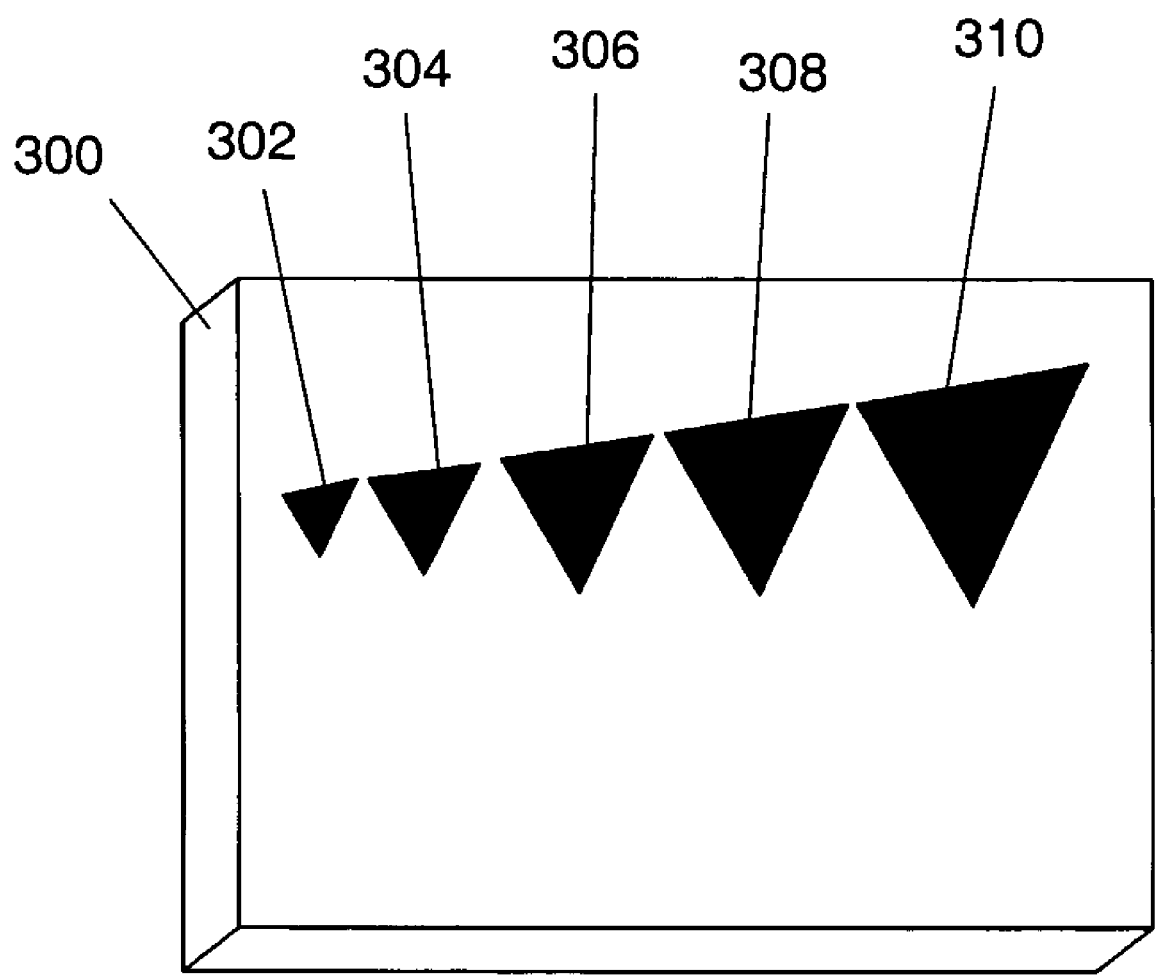
FIG. 5 is a perspective schematic view of a ferroelectric substrate with an array of prism-shaped electrode segments useful for creating an electrooptic deflection device for light.

FIG. 5 shows a ferroelectric crystal substrate 300 with an array of triangularly shaped poling electrode segments 302, 304, 306, 308 and 310 that are useful for creating an electro-optic deflection device for light. The electrode segments 302, 304, 306, 308 and 310 are applied to one of the opposite surfaces of a ferroelectric crystal substrate 300, and a uniform conducting plane is applied to the other surface, although the other surface may alternatively use an appropriate segmented electrode. Next, a poling voltage profile is applied across each of the electrode segments. Note that the actual voltage profile for each of the segments may be found using methods that are well known to one of ordinary skill in the field of poling. Upon completion of poling, the electrode segments 302, 304, 306, 308 and 310 as well as the corresponding electrode segments on the opposite surface are removed from the ferroelectric crystal substrate 300. The poled patterns in the ferroelectric crystal substrate 300 resemble a series of wedge-shaped prisms, with adjacent wedges generally alternating between "up" domains and "down" domains.

To complete fabrication of the electro-optic deflection device, two operational electrodes (not shown) are placed on the opposing surfaces of the ferroelectric crystal substrate 300. These electrodes, which are functionally unrelated to the poling electrodes described above, are used in operation of the device to provide a deflection voltage across the patterned ferroelectric crystal substrate 300. An optical beam travels in a plane between and generally parallel to the operational electrodes, and is deflected angularly by an amount that is dependent on the applied deflection voltage. Note that the typical voltages applied to the operational electrodes are far less than the poling voltages, and that during operation of the electro-optic device, no permanent changes are made to the domain patterns in the ferroelectric crystal substrate 300.

To achieve a larger deflection for a given electric field, or a given voltage across the pair of operational electrodes, the prisms should have different sizes and shapes; in particular, smaller near the entrance of the device and larger at the exit. By segmenting the poling electrode used to create this type of poled ferroelectric device, the prisms of different size and shape may be poled individually to separately optimize each portion of the overall domain-reversed pattern. Partitioning the electrode into segments enables a higher quality poled ferroelectric device to be obtained than might otherwise be obtained using a unitary electrode. Reproduction of a desired domain-reversed structure is more uniform throughout the ferroelectric crystal, and may be carried out more consistently with each poling attempt. The increase in consistency in the poling process may lead to more predictable behavior in the devices that use the poled ferroelectric materials, and consequently, better devices.

In many instances periodic poling is performed on the wafer level, with each step in the process performed on a wafer's worth of devices all at once. Wafer-level processing is generally more efficient and less expensive than processing each device individually. There are certain drawbacks to wafer-level processing, with the most serious being a non-uniformity in performance across the wafer. A non-uniformity in device performance may be caused by a variety of sources, such as variations in the material, non-uniformity in the lithographically-exposed regions, and geometrically-induced process variations across the wafer. Furthermore, as processes evolve toward larger-sized wafers, the non-uniformity inherently becomes more severe.

For a device that uses a poled ferroelectric crystal substrate, the substrate is preferably purchased and delivered in wafer form, processed in wafer form, then diced into individual components for insertion into a particular device. The electrodes for poling are preferably deposited onto the full, useable surface area of the ferroelectric wafer, and poling is preferably performed before the wafer is diced. Compared to poling one device at a time, simultaneous poling of an entire wafer of devices may introduce significantly more variation simply because the wafer size is so large, typically several centimeters in diameter. Many of the wafer-based processes (coatings, exposures, material properties, and so forth) have their own variations across the wafer, all of which contribute undesirably to the variation in the finished device.

Many of the undesirable variations across the wafer may be corrected by segmenting the full wafer-sized electrode into smaller, separately addressable electrode portions, and adjusting the poling voltage profile for each portion in response to the local characteristics, which include variations in material properties, lithography, and electrode shape and size. Because the poling voltage profile is tailored for each particular area on the wafer, the fidelity of the desired domain pattern may be optimized for each area, and the overall quality of the produced devices may be improved over the case in which the entire wafer is poled all at once. The compromising of optimal conditions imposed by the use of a continuous electrode, which inherently requires an averaging of particular quantities across the wafer area, is avoided.

The use of segmented electrodes provides an exceptional degree of control over the domain-reversed patterns that may be created. Arcing and extraneous electric fields between neighboring segments may be reduced by appropriately biasing of the segments that are not being driven. Moreover, a variety of different shapes of domain-reversed patterns may be achieved by varying the size and shape of pairs of driven electrodes.

Figure 6:
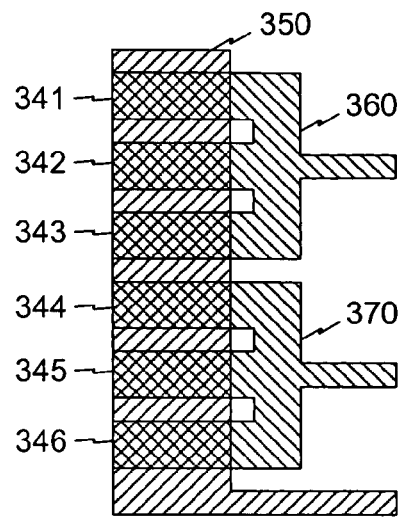
FIG. 6 is a schematic view of a segmented electrode layout.

FIG. 6 shows an upper electrode having segments 360 and 370 and a lower electrode 350. A grating structure of domain-reversed patterns forms during poling where the upper electrode segments 360 and 370 overlap the lower electrode 350, which is indicated by cross-hatched regions 341–346.

Figure 7:
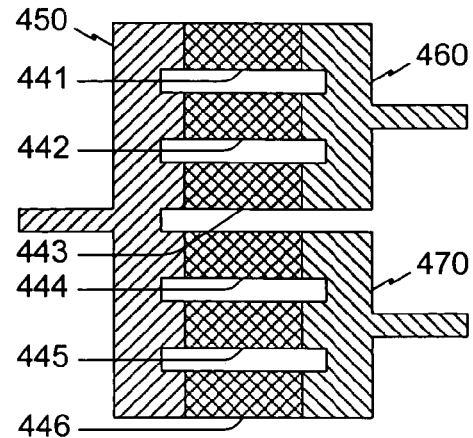
FIG. 7 is a schematic view of another segmented electrode layout.

FIG. 7 shows a technique for forming a grating structure having further improved fidelity. An upper electrode is formed from segments 460 and 470, while a lower electrode 450 is provided with features that match corresponding features of the upper electrode segments 460 and 470. A grating structure of domain-reversed patterns forms where upper electrode segments 460 and 470 overlap the lower electrode 450, which is indicated by cross-hatched regions 441–446. The use of matching corresponding features on both electrodes reduces field spreading, whereby fidelity is improved.

Figure 8:
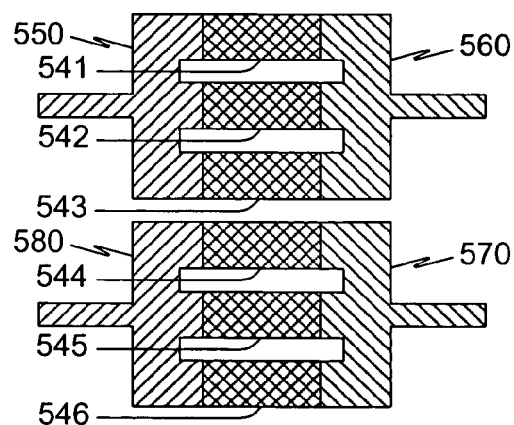
FIG. 8 is a schematic view of another segmented electrode layout.

FIG. 8 shows another technique for forming a grating structure having further improved fidelity. An upper electrode is formed with segments 560 and 570, while a lower electrode is formed with segments 550 and 580. Features of the lower electrode segments 550 and 580 match corresponding features of the upper electrode segments 560 and 570. A grating structure of domain-reversed patterns forms where upper electrode segments 560 and 570 overlap the lower electrode segments 550 and 580, which is indicated by cross-hatched regions 541–546. The use of matching corresponding features and corresponding electrode segments on both electrodes may be suitable for applying an optimal bias voltage to the undriven segments to prevent arcing.

Figure 9:
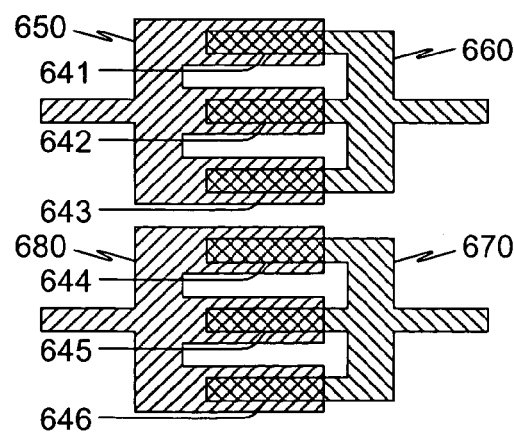
FIG. 9 is a schematic view of another segmented electrode layout.

FIG. 9 shows another technique for forming a grating structure whose shape is established both by the shape of the electrode segment as well as the extent of a segment of one electrode relative to a segment of the opposing electrode. An upper electrode is formed with segments 660 and 670, while a lower electrode is formed with segments 650 and 680. Features of the lower electrode segments 650 and 680 are somewhat larger than corresponding features of the upper electrode segments 660 and 670. A grating structure of domain-reversed patterns forms where upper electrode segments 660 and 670 overlap the lower electrode segments 650 and 680, which is indicated by cross-hatched regions 641–646. Note that the actual crystal domains are oriented vertically, but the sides of the domain-reversed patterns are sloped rather than vertical.

Figure 10:
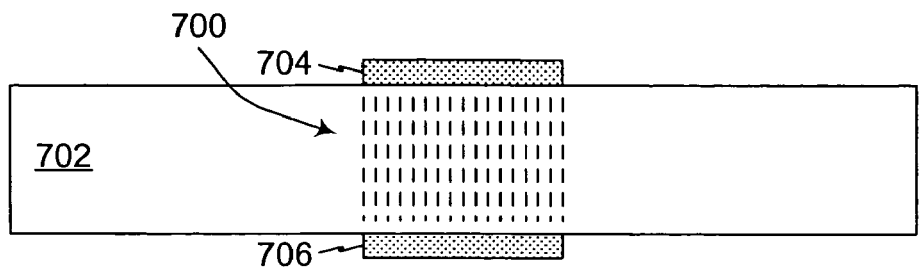
FIG. 10 is a cross-sectional view of a segmented electrode configuration.
Figure 11:
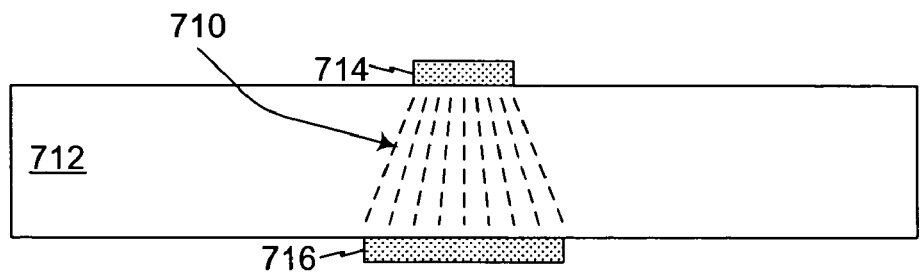
FIG. 11 is a cross-sectional view of another segmented electrode configuration.

The formation of vertically sided patterns is contrasted with the formation of sloped patterns in FIG. 10 and FIG. 11. FIG. 10 shows an electric field 700 that is formed in a ferroelectric crystal substrate 702 between two coextensive electrode segments 704 and 706. The resulting domain-reversed pattern (not shown) has vertical side walls. FIG. 11 shows an electric field 710 that is formed in a ferroelectric crystal substrate 712 between two differently sized electrode segments 714 and 716. As above, the actual crystal domains are oriented vertically, but the resulting domain-reversed pattern (not shown) has sloped side walls.

Figure 12:
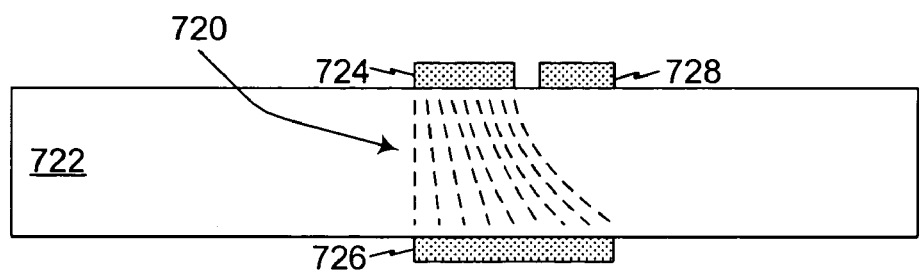
FIG. 12 is a cross-sectional view of another segmented electrode configuration.

FIG. 12 shows how an electrode may be provided with additional electrode segments to specifically tailor the electric field in the ferroelectric crystal to obtain a great variety of differently shaped domain-reversed patterns. FIG. 12 shows an electric field 720 that is formed in a ferroelectric crystal substrate 722 between two differently sized electrode segments 724 and 726. A further electrode segment 728 is suitably biased during the poling process to cause the electric field to bend. As before, the actual crystal domains are oriented vertically, but the resulting domain-reversed pattern (not shown) has a vertical side wall and a sloped curved side wall.

Figure 13:
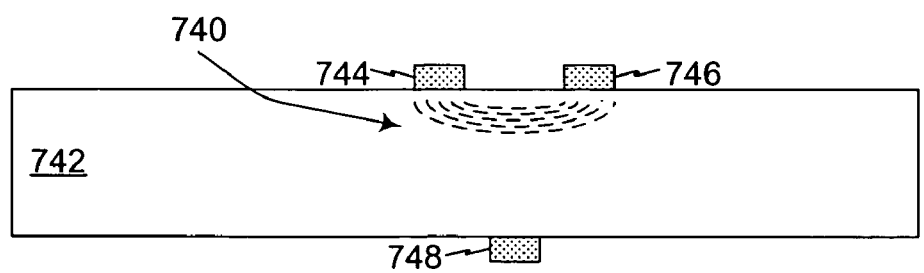
FIG. 13 is a cross-sectional view of another segmented electrode configuration.

FIG. 13 shows how domain-reversed patterns with different orientations can be established in ferroelectric crystal. A ferroelectric crystal substrate 742 has an upper electrode with segments 744 and 746. The ferroelectric crystal substrate 742 may be poled with a potential difference applied to the segments 744 and 746 to create an electric field 740 from which a domain-reversed pattern (not shown) generally parallel to the major surfaces of the ferroelectric crystal substrate 742 may be formed. Other electrode segments such as segment 748 on the lower surface may be powered in such a way as to modify the resulting shape of the domain-reversed pattern. Note that the pattern in FIG. 13 only extends a small distance downward into the crystal.

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A method for poling ferroelectric crystal material to form one or more optical devices, comprising:
   defining a first optically effective region in a first predetermined portion of the ferroelectric crystal material at least in part with a first electrode segment;
   poling the first predetermined portion with a first poling voltage profile to establish a first domain aligned in a predetermined direction, the first domain having an edge that defines at least part of the first optically effective region, and the first poling voltage profile being optimized for the first predetermined portion;
   defining a second optically effective region in a second predetermined portion of the ferroelectric crystal material at least in part with a second electrode segment; and
   poling the second predetermined portion with a second poling voltage profile to establish a second domain aligned in a predetermined direction, the second domain having an edge that defines at least part of the second optically effective region, and the second poling voltage profile being optimized for the second predetermined portion.

2. The method of claim 1 wherein:
the first optically effective region defining step comprises disposing the first electrode segment on a first surface of the ferroelectric crystal material; and
the second optically effective region defining step comprises disposing the second electrode segment on the first surface of the ferroelectric crystal material.

3. The method of claim 2 wherein:
the first electrode segment disposing step comprises fabricating the first electrode segment on the first surface of the ferroelectric crystal material; and
the second electrode segment disposing step comprises fabricating the second electrode segment on the first surface of the ferroelectric crystal material.

4. The method of claim 2 wherein:
the first electrode segment disposing step comprises fabricating the first electrode segment on a first surface of a separate substrate; and
the second electrode segment disposing step comprises fabricating the second electrode segment on the first surface of the separate substrate;
the first and second electrode segment disposing steps further comprising disposing the first surface of the separate substrate on the first surface of the ferroelectric crystal material.

5. The method of claim 2 wherein:
the first electrode segment comprises a plurality of first features and a first interconnection for the first features;
the first electrode segment disposing step comprises fabricating the first features on the first surface of the ferroelectric crystal material, and fabricating the first interconnection on a first surface of a separate substrate;
the second electrode segment comprises a plurality of second features and a second interconnection for the second features; and
the second electrode segment disposing step comprises fabricating the second features on the first surface of the ferroelectric crystal material, and fabricating the second interconnection on the first surface of a separate substrate;
the first and second electrode segment disposing steps further comprising disposing the first surface of the separate substrate on the first surface of the ferroelectric crystal material.

6. The method of claim 1 wherein:
the first optically effective region defining step comprises disposing the first electrode segment on a first surface of the ferroelectric crystal material, the first electrode segment consisting of a plurality of interconnected features of a substantially uniform electrical shape and size;
the first predetermined portion poling step comprises optimizing the first poling voltage profile in accordance with the electrical shape and size of the features of the first electrode segment;
the second optically effective region defining step comprises disposing the second electrode segment on the first surface of the ferroelectric crystal material, the second electrode segment consisting of a plurality of interconnected features of a substantially uniform electrical shape and size; and
the second predetermined portion poling step comprises optimizing the second poling voltage profile in accordance with the electrical shape and size of the features of the second electrode segment.

7. The method of claim 1 wherein:
the first optically effective region defining step comprises disposing the first electrode segment on a first surface of the ferroelectric crystal material, the first electrode segment having a plurality of features and being of a size selected to allow compensation for adverse poling effects of electrical and physical non-uniformity in the ferroelectric crystal material;
the first predetermined portion poling step comprises optimizing the first poling voltage profile in accordance with the features of the first electrode segment;
the second optically effective region defining step comprises disposing the second electrode segment on the first surface of the ferroelectric crystal material, the second electrode segment having a plurality of features and being of a size selected to allow compensation for adverse poling effects of electrical and physical non-uniformity in the ferroelectric crystal material; and
the second predetermined portion poling step comprises optimizing the second poling voltage profile in accordance with the features of the second electrode segment.

8. The method of claim 7 further comprising:
monitoring the poling of the first predetermined portion to detect completion thereof, whereby the adverse poling effects of electrical and physical non-uniformity in the ferroelectric crystal material are compensated for with respect to the first electrode segment; and
monitoring the poling of the second predetermined portion to detect completion thereof, whereby the adverse poling effects of electrical and physical non-uniformity in the ferroelectric crystal material are compensated for with respect to the second electrode segment.

9. The method of claim 1 wherein:
the first optically effective region defining step comprises disposing the first electrode segment on a first surface of the ferroelectric crystal material, the first electrode segment being of a size selected to allow compensation for adverse poling effects of electrical and physical non-uniformity in the ferroelectric crystal material, and consisting of a plurality of interconnected features of a substantially uniform electrical shape and size;
the first predetermined portion poling step comprises optimizing the first poling voltage profile in accordance with the electrical shape and size of the features of the first electrode segment;
the second optically effective region defining step comprises disposing the second electrode segment on the first surface of the ferroelectric crystal material, the second electrode segment being of a size selected to allow compensation for adverse poling effects of electrical and physical non-uniformity in the ferroelectric crystal material, and consisting of a plurality of interconnected features of a substantially uniform electrical shape and size; and
the second predetermined portion poling step comprises optimizing the second poling voltage profile in accordance with the electrical shape and size of the features of the second electrode segment.

10. The method of claim 9 further comprising:
monitoring the poling of the first predetermined portion to detect completion thereof, whereby the adverse poling effects of electrical and physical non-uniformity in the ferroelectric crystal material are compensated for with respect to the first electrode segment; and monitoring the poling of the second predetermined portion to detect completion thereof, whereby the adverse poling effects of electrical and physical non-uniformity in the ferroelectric crystal material are compensated for with respect to the second electrode segment.

11. The method of claim 1 wherein the first electrode segment in the first optically effective region defining step and the second electrode segment in the second optically effective region defining step have substantially identical electrical shapes and sizes for establishing substantially identical first and second domains.

12. The method of claim 11 wherein:
the first predetermined portion of the ferroelectric crystal material has first electrical and physical properties, and the second predetermined portion of the ferroelectric crystal material has second electrical and physical properties, the first and second electrical and physical properties being different;
the first predetermined portion poling step comprises optimizing the first poling voltage profile to compensate for adverse poling effects of the first electrical and physical properties; and
the second predetermined portion poling step comprises optimizing the second poling voltage profile to compensate for adverse poling effects of the second electrical and physical properties;
the first poling voltage profile and the second poling voltage profile being different from one another.

13. The method of claim 1 wherein the first electrode segment in the first optically effective region defining step and the second electrode segment in the second optically effective region defining step have dissimilar electrical shapes and sizes for establishing dissimilar first and second domains.

14. A substrate for use in fabricating optical elements for optical devices, comprising:
a volume of ferroelectric crystal material;
means for defining a first optically effective region in a first predetermined portion of the ferroelectric crystal material at least in part with a first electrode segment;
means for poling the first predetermined portion with a first poling voltage profile to establish a first domain aligned in a predetermined direction, the first domain having an edge that defines at least part of the first optically effective region, and the first poling voltage profile being optimized for the first predetermined portion;
means for defining a second optically effective region in a second predetermined portion of the ferroelectric crystal material at least in part with a second electrode segment; and
means for poling the second predetermined portion with a second poling voltage profile to establish a second domain aligned in a predetermined direction, the second domain having an edge that defines at least part of the second optically effective region, and the second poling voltage profile being optimized for the second predetermined portion.

15. The substrate of claim 14 wherein the first electrode segment and the second electrode segment have substantially identical electrical shapes and sizes for establishing substantially identical first and second domains.

16. The substrate of claim 15 wherein:
the first predetermined portion of the ferroelectric crystal material has first electrical and physical properties, and the second predetermined portion of the ferroelectric crystal material has second electrical and physical properties, the first and second electrical and physical properties being different;
the first predetermined portion poling means comprises means for optimizing the first poling voltage profile to compensate for adverse poling effects of the first electrical and physical properties; and
the second predetermined portion poling means comprises means for optimizing the second poling voltage profile to compensate for adverse poling effects of the second electrical and physical properties;
the first poling voltage profile and the second poling voltage profile being different from one another.

17. The substrate of claim 14 wherein the first electrode segment and the second electrode segment have dissimilar electrical shapes and sizes for establishing dissimilar first and second domains.

18. A substrate for use in fabricating optical elements for optical devices, comprising:
a volume of ferroelectric crystal material;
a first electrode segment disposed on a first surface of the ferroelectric crystal material and consisting of a plurality of first interconnected features of a substantially uniform electrical shape and size for establishing a first domain extending into the ferroelectric crystal material from the first electrode segment, upon application of a first poling voltage profile; and
a second electrode segment disposed on the first surface of the ferroelectric crystal material and consisting of a plurality of second interconnected features of a substantially uniform electrical shape and size for establishing a second domain extending into the ferroelectric crystal material from the second electrode segment, upon application of a second poling voltage profile;
wherein the electrical shape and size of the first interconnected features differs from the electrical shape and size of the second interconnected features.

19. The substrate of claim 18 further comprising:
a third electrode disposed on a second surface of the ferroelectric crystal material opposite the first surface;
wherein the first and second domains extend through the ferroelectric crystal material between the first surface and the second surface.

20. The substrate of claim 19 wherein the third electrode is segmented.

21. The substrate of claim 19 wherein:
the third electrode comprises a plurality of third features corresponding to the first features, and a plurality of fourth features corresponding to the second features.

22. The substrate of claim 21 wherein the third electrode comprises a third electrode segment containing the third features, and a fourth electrode segment containing the fourth features, the first and third electrode segments being aligned with respect to one another, and the second and fourth segments being aligned with respect to one another.

23. The substrate of claim 18 wherein:
the first electrode segment is of a size selected to allow compensation for adverse poling effects of electrical and physical non-uniformity in the ferroelectric crystal material; and
the second electrode segment is of a size selected to allow compensation for adverse poling effects of electrical and physical non-uniformity in the ferroelectric crystal material.

24. A substrate for use in fabricating optical elements for optical devices, comprising:
- a volume of ferroelectric crystal material;
- a first electrode segment disposed on a first surface of the ferroelectric crystal material and being sized to allow compensation for adverse poling effects of electrical and physical non-uniformity in the ferroelectric crystal material; and
- a second electrode segment disposed on the first surface of the ferroelectric crystal material and being sized to allow compensation for adverse poling effects of electrical and physical non-uniformity in the ferroelectric crystal material.

25. The substrate of claim 24 wherein:
- the first electrode segment consists of a plurality of first interconnected features of a substantially uniform electrical shape and size; and
- the second electrode segment consists of a plurality of second interconnected features of a substantially uniform electrical shape and size;
- wherein the electrical shape and size of the first interconnected features differs from the electrical shape and size of the second interconnected features.

* * * * *